United States Patent [19]

Wohlrab

[11] 4,249,880
[45] Feb. 10, 1981

[54] MOLD-CLOSING DEVICE FOR AN INJECTION-MOLDING MACHINE

[75] Inventor: Walter Wohlrab, Weissenburg, Fed. Rep. of Germany

[73] Assignee: Krauss-Maffei Aktiengesellschaft, Munich, Fed. Rep. of Germany

[21] Appl. No.: 99,895

[22] Filed: Dec. 3, 1979

[30] Foreign Application Priority Data

Dec. 5, 1978 [DE] Fed. Rep. of Germany ....... 2852516

[51] Int. Cl.³ ............................................. B29F 1/06
[52] U.S. Cl. .................................. 425/451.2; 425/590
[58] Field of Search ...................... 425/589, 590, 451.2, 425/DIG. 223

[56] References Cited

U.S. PATENT DOCUMENTS

| 3,263,277 | 8/1966 | Ohlendorf et al. | 425/451.2 |
| 3,270,372 | 9/1966 | Hesse | 425/451.2 |
| 3,677,685 | 7/1972 | Aoki | 425/451.2 |
| 4,013,392 | 3/1977 | Smith | 425/451.2 X |
| 4,017,236 | 4/1977 | Penkman et al. | 425/451.2 X |
| 4,032,277 | 6/1977 | Linde et al. | 425/451.2 X |
| 4,158,327 | 6/1979 | Aoki | 425/451.2 X |

Primary Examiner—J. Howard Flint, Jr.
Attorney, Agent, or Firm—Karl F. Ross

[57] ABSTRACT

A mold-closing device for an injection-molding machine has a main piston connected to the mold-carrying plate of a movable mold half and is provided with a pressure-multiplying piston which closes a passage between sides of the main piston to render effective the differential action of the multiplier piston. The multiplier piston can be shifted prior to the main piston by a time-delay device in the pressure lines and/or by a mechanical element.

9 Claims, 3 Drawing Figures

MOLD-CLOSING DEVICE FOR AN INJECTION-MOLDING MACHINE

FIELD OF THE INVENTION

My present invention relates to a mold-closing device for an injection-molding machine and, more particularly, to a mold-closing device of the type which has an increased pressure following the closing stroke to resist the pressure developed in the mold cavity upon injecting synthetic resin material into the latter.

BACKGROUND OF THE INVENTION

An injection-molding machine generally comprises a pair of mold-carrying plates each provided with a so-called mold half, the mold halves defining at least one cavity therebetween. The machine can be provided with an injection ram or other means for forcing, at an elevated pressure, a plastified synthetic-resin mass into the mold cavity formed between the mold halves in a closed position of the mold.

At least one of the mold-carrying plates is generally movable, i.e. can be displaced toward and away from the other plate in a mold-closing and mold-opening direction, respectively. For this purpose it is known to provide a mold-closing device which can be hydraulically actuated.

For example, it is known to provide a double-acting main piston which is coupled with the movable mold-carrying plate and which is shiftable in a cylinder which defines with the main piston an opening-side compartment and a closing-side compartment. The opening-side compartment is the compartment which is turned away from the mold while the closing-side compartment is proximal to the mold. The opening-side compartment is generally pressurized for mold-closing movement of the main piston while the closing-side compartment may be pressurized for mold-closing movement of the piston.

In addition, the movable mold plate can be provided with a rapid-action piston-and-cylinder arrangement for rapid-opening and rapid-closing movements of the movable mold plate. To allow this rapid-action hydraulic device to be effective, the main piston can be provided with a closable passage communicating between its main compartments.

Thus, when only the sliding friction of the mold plate and its assembly for opening and closing movements must be overcome, the rapid-action hydraulic unit is effective and is not impeded by the main piston-and-cylinder arrangement because of the communication between the two compartments thereof through the closable passage in the main cylinder.

When, however, greater force must be applied, for example, in the final mold-closing stage, to retain the mold closed against the development of considerable pressure in the mold cavity during the injection step, and to break open the mold after injection of the article, the passage between the main compartments is closed and the main compartments are selectively pressurized to develop considerable force in the mold-opening or mold-closing directions as required.

A mold-closing device of this type is described in German patent document (open application—Offenlegungsschrift) DE OS No. 1,778,952. In this system the cylinder chambers or compartments fore and aft of the main piston are connected by a passage whose purpose is to minimize the quantity of fluid which must be displaced by the main piston. This system has, however, the disadvantage that a special valve must be provided to close this passage when the main cylinder and its piston are to be effective, this valve requiring special controls. Furthermore, frequently the system pressure to which the mold-closing device is connected will require dimensioning the main piston for the requisite mold-closing or mold-opening force, so that the system is relatively expensive or unwieldy.

Mention may also be made of mold-closing systems using hydraulic principles as, for example, represented in German patent document (open application—Offenlegungsschrift) No. 2,432,638, which connect the main cylinder with a pressure-transmitting piston-and-cylinder arrangement. In this system, a significant disadvantage arises because additional hydraulic lines are required to connect the second cylinder with the first. Furthermore, a compact assembly of the two cannot be provided readily.

Note also the mold-closing system which is disclosed in German patent document (open application—Offenlegungsschrift) No. 2,423,806 and which appears to require a relatively complex main piston construction and, although it has an opening and closing device coupled therewith, cannot readily generate extremely high closing forces, except by a use of a relatively large main piston with the disadvantages already described.

A similar disadvantage appears to be present in the mold-closing device of German patent document (printed application—Auslegeschrift) No. 1,554,881.

OBJECTS OF THE INVENTION

It is, therefore, the principal object of the present invention to provide a mold-closing device for the purposes described which has a compact construction, which can operate with system pressure and yet develop relatively high mold-closing forces, and which has a simplified control.

Another object of the invention is to provide an improved mold-closing device which avoids the drawbacks of earlier systems including those described above.

SUMMARY OF THE INVENTION

These objects and others which will become apparent hereinafter are attained in accordance with the present invention, in a mold-closing device which has, as described previously, a main piston subdividing a main cylinder into an opening-side compartment and a closing-side compartment communicating between them by means of a closable passage, and a second hydraulic device for rapid-opening and rapid-closing movements of the mold plate, the system of the present invention including a pressure-transformer piston which is axially shiftable in a respective cylinder, preferably coaxial with the main cylinder, in the main piston and whose cylinder in turn is subdivided by the pressure transformer (pressure-multiplier) piston into an opening-side and a closing-side compartment respectively. According to the invention, moreover, the passage between the main compartment is disposed in line with this multiplier piston so that is axial displacement can close the passage and upon closing this passage can apply the multiplied pressure to the main piston surface effectively in the mold-closing direction.

Advantageously, the multiplier piston has a large effective surface area exposed to the fluid pressure in its opening-side compartment and a smaller effective surface area exposed to the fluid in its closing-side compartment which can communicate with the opening-side main compartment and the aforementioned closable passage within the main piston.

Thus this smaller effective area pressurizes the fluid delivered to the main piston after the passage has been closed preferably by a plunger projecting from the smaller-surface portion of the pressure-multiplier differential piston.

According to the invention, the opening-side compartments of the main cylinder and the pressure-multiplier cylinder are connected to the source for the existing pressure in parallel by respective hydraulic lines.

The highly compact structure of the present invention has the advantage further that the pressure modifier and valve system for the passage are functionally united in a single unit, thereby simplifying the hydraulic system and allowing system pressure to be used with relatively small dimensions of the main piston while nevertheless generating significant forces for retaining the mold in a closed state.

According to a feature of the invention, the rapid-action mold-closing and mold-opening hydraulic unit can comprise a rapid-action piston which lies along the axis of the main piston and can be coupled therewith, i.e. these two pistons can form a single unit thereby providing an especially compact construction for the hydraulic drive coupled to the mold-carrying plate.

The pressure-multiplying piston can be shifted into its passage-closing position by a separate element, i.e. mechanically, preferably by an axially shiftable setting piston responsive to hydraulic pressure. Alternatively, or in addition, a time delay device, e.g. a delayed-opening check valve or a throttle, can be provided in the hydraulic line to the main cylinder to ensure a proper sequence of operation of the passage-closing member and the main piston.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
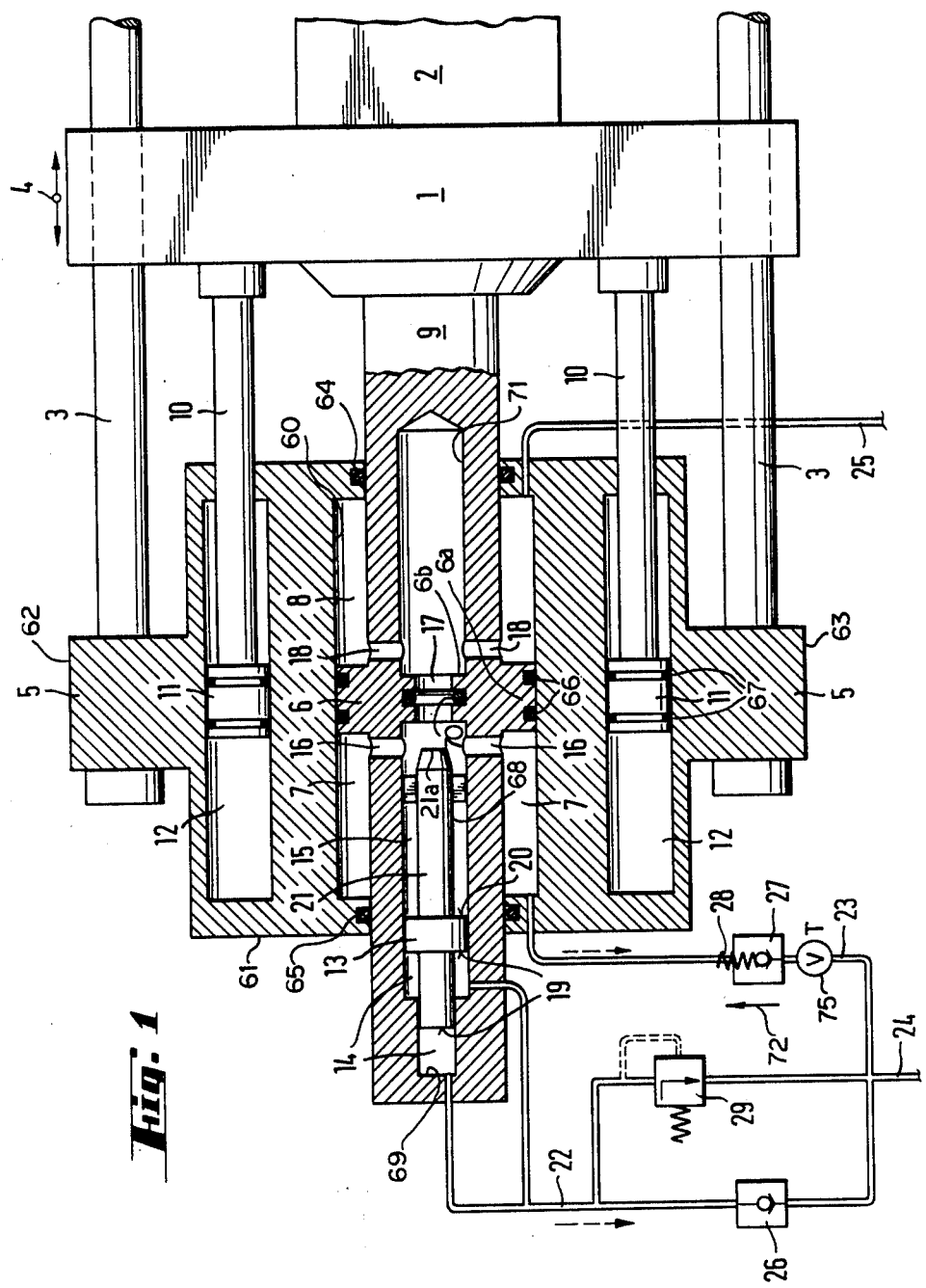
FIG. 1 is an elevational view, partly in longitudinal section, of the hydraulic mold-closing device for an injection molding machine in accordance with the present invention.

In FIG. 1 I have shown a portion of an injection-molding machine in accordance with the present invention which comprises a mold-carrying plate 1 to which the associated mold half 2 is affixed in any conventional manner.

It will be understood that the right-hand portion of the machine, provided with the injection orifice, the injection ram for the synthetic-resin material, the right-hand mold half, the stationary or movable mold-carrying plate for this other mold half, the ejector system for the molded article and the machine bed, all have not been illustrated since they are conventional in the art.

The mold-carrying plate 1 is guided on rods, posts or columns 3 for movement in the direction of arrow 4, representing the mold-closing and the mold-opening directions. At their left-hand ends, the guide bars 3 are fixed in a support plate 5 which may form part of the machine bed and preferably is formed unitary with or contains the hydraulic elements for displacing the mold-carrying plate in the described linear motion. At their opposite ends, the guide bars 3 can be mounted in the right-hand head of the machine support or bed.

The hydraulic actuating system of the present invention comprises a main piston 6 which is slidable in a main cylinder 60 formed in a casting 61 which can have the lateral flanges 62 and 63 constituting the support plate 5 mentioned previously.

The cylinder bore 60, which is sealed at its ends by O-rings 64 and 65, is subdivided internally into compartments 7 and 8. Since the bore 60 extends in the mold-opening and mold-closing directions, the main cylinder compartment 7 is referred to as an opening-side compartment while the main compartment 8 is referred to as a closing-side compartment.

The piston 6, which is formed with seals 66, is extended axially by a column 9 to either side of the annular flange of this column which carries the seals 66, the column extensions cooperating with the seals 64 and 65 mentioned previously.

At its right-hand end, the column 9 is affixed to the mold-carrying plate 1.

A plurality of piston rods 10, disposed symmetrically with respect to an axial plane through the piston 6, are also connected to the mold-carrying plate 1 and are provided with rapid-action pistons 11 whose effective areas are each smaller than the effective area of the piston 6. The pistons 11 carry seals 67 and are slidable in rapid-acting cylinders 12 which are also formed in the body 61.

The main piston 6 has a coaxial cylinder bore 68 which is provided with a step of reduced diameter at 69, this bore receiving a pressure-transforming piston 13 which can be described as a pressure multiplier as will be apparent hereinafter. The piston 13, which is axially shiftable in the mold-opening and mold-closing directions, subdivides the cylinder bore 68, 69 into an opening-side compartment 14 and a closing-side compartment 15, respectively.

The opening-side main cylinder compartment 7 and the closing-side main cylinder compartment 8 communicate through a passage formed in the main piston 6 and include radial passages 16 formed on the left-hand side of the piston flange 6a, an axial passage 17 through the web 6b of this flange terminating the bore 68, and radial passages 18 on the right-hand side of flange 6a. The radial bores 18 and the axial bore 17, which is equipped with O-ring seal 70, are connected via an axial bore 71 on the right-hand side of the web 6b.

The pressure-transforming piston 13 comprises a stepped body formed on the left-hand side (exposed to the pressure in compartment 14) a relatively large effective surface area 19. On the right-hand side of this piston, exposed to the pressure in compartment 15, the smaller effective surface area 20 is provided.

From the shoulder forming the effective surface 20, a valve plunger 21 extends axially and has a frustoconical end 21a adapted to fit readily into the seal 70 so that the seal can slidably hug the plunger 21 whose cross-sectional area thus can correspond to the effective cross section of the bore 17.

The opening-side compartment 14 and the opening-side main cylinder compartment 7 are connected via lines 22 and 23 to a common fluid pressure source represented by a line 24. Naturally, this source or its reservoir may be connected to line 24 by a valve of conventional design and the line 24 can represent the hydraulic system usually provided in injection-molding machines.

The closing-side main cylinder compartment 8 is provided with a pressurizable line 25 which is active for the retraction of the mold-carrying plate to break open the mold after injection has occurred.

The lines 22 and 23 are provided with check valves 26 and 27, respectively, to block reverse flow of the medium (broken-line arrows) with the latter check valve forming a time-delay device represented by a spring 28 blocking forward flow of the pressurized fluid, i.e. delivery of fluid in the direction of the arrow 72.

A bypass for the check valve 26 is provided by a pressure relief valve 29 for relieving the pressure at the pressure-transforming piston 13 during the mold-opening process.

Figure 2:
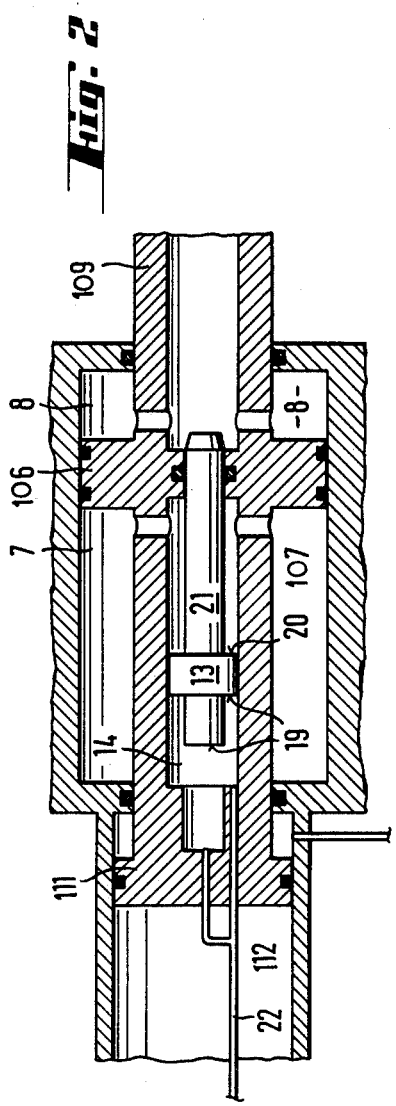
FIG. 2 is a partial section of another embodiment of the invention.

In the embodiment of FIG. 2, the rapid-opening piston 111, which is functionally equivalent to the piston 11 previously described, and the main piston 106 form a unit upon the same column 109 which can be connected to the mold-carrying plate 1. In this embodiment, the cylinder 112 for the rapid-opening piston 111 is axially aligned with the cylinder compartment 107. All other elements, bearing numerals identical to those of FIG. 1, are functionally equivalent to the elements of this FIGURE bearing the same reference numerals.

Figure 3:
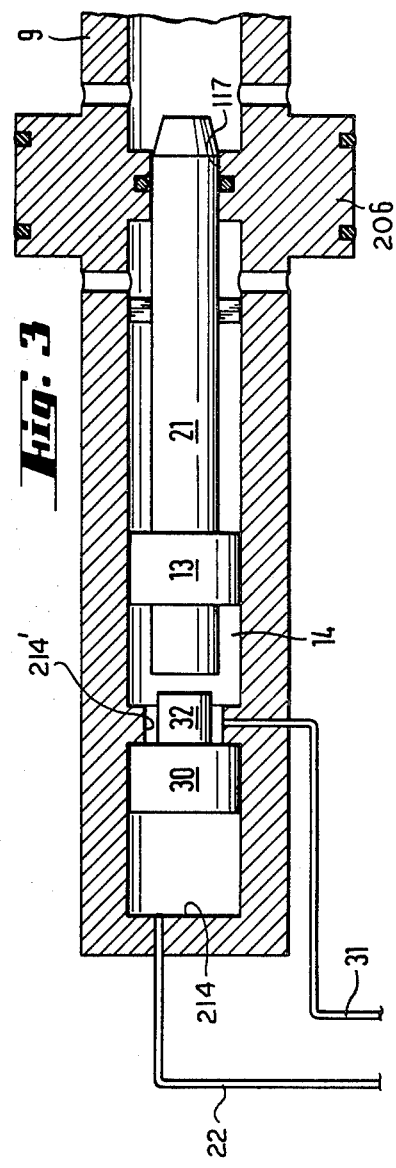
FIG. 3 is an axial cross-sectional view, drawn to a slightly larger scale than FIG. 1, showing a portion of the hydraulic actuator for the mold-carrying plate in accordance with still another embodiment of the invention.

In the embodiment of FIG. 3, the main piston 206 is provided with the pressure-transforming piston 13 in the manner previously described but ahead of this piston, a setting piston 30 is provided in a cylinder 214 which communicates via a passage 214' with the compartment 14.

The piston 30 is axially shiftable and has an abutment 32 which can be received with clearance in the passage 214'. A line 31 opening at this passage 214' communicates with the pressure line 24 and line 22 opens here into the cylinder 214.

The abutment 32 projects sufficiently through the opening 214' that it can engage the pressure-transforming piston 13 and force the latter to the right until the bore 17 is closed.

The system of FIG. 3 can be used directly behind the piston 13 in the embodiment of FIG. 1 or in the embodiment of FIG. 2.

The cylinders 12 are pressurized by means not shown to initiate a rapid-closing motion of the mold plate 1 to the right, whereupon line 24 is pressurized with the system pressure. Fluid passes via lines 22 and 23 into the opening-side compartment 14 and the opening-side main cylinder compartment 7 and hence via passage 16 into the closing-side compartment 15.

Since the opening-side compartment 14 has a smaller volume than the opening-side compartment 7 and the closing-side compartment combined, the medium in compartment 14 initially tends to displace the piston 13 to the right and close the overflow opening 17.

Thus, even before the medium supplied by line 24 has displaced the piston 6, the piston 13 is shifted to the right, a sequence which is guaranteed by the presence of the time-delay element 28 in line 23.

Since the bore 17 is blocked, the pressure of the source is applied to the left-hand side of the main piston 6 to develop the remaining mold-closing and retention force. This force is increased by the action of the pressure-multiplying piston by the differential action of its unequal effective surfaces as described. In a static state under pressure, for example, the pressure applied to the piston 6 to the right will be the product of the pressure applied to compartment 14 and the ratio of the surface area 20. This ratio is of course the multiplier of the pressure transformer 13. A backflow of the medium is blocked by the check valves 26 and 27.

Upon conclusion of the injection molding step, the compartment 14 and the closing-side compartment 15 as well as the opening-side compartment 7 are relieved via the pressure-relief valve 29 upon the application of fluid pressure to line 25 for the mold-opening stroke. The mold-carrying plate can then be drawn rapidly to the left by the application of pressure to the right-hand sides of pistons 11 by means not shown.

The system of FIG. 2, of course, operates in the same way, except that the rapid opening and rapid closing pressures are supplied to the cylinder 112.

In the operation of the system of FIG. 3, the pressure-transformer 13, during the mold-closing operation, first mechanically shifts the pressure-transformer piston 13 into a position in which it closes the overflow opening 17 to enable the multiplied pressure to be effective for the final closing and mold-locking stages which are effective with a force able to counter the injection-molding pressure. In this case it is advantageous to provide the check valve of line 31 which communicates with the compartment 14 and 7 with a time-delay device similar to that shown at 27,28 in FIG. 1.

The time delay afforded by the spring 28 of check valve 27, which delays the opening of the check valve 27 by comparison with check valve 26, can also be achieved by a throttle valve 75 in line 23, the throttle valve being used in addition to the spring 28 or in place thereof.

I claim:

1. A mold-closing device for an injection-molding machine having a movable mold-carrying plate, said mold-closing device comprising:

a main piston connected to said plate;

support means formed with a main cylinder extending in a mold-opening and a mold-closing direction, said main piston being shiftable in said main cylinder and subdividing said cylinder into an opening-side chamber and a closing-side chamber;

a pressure-transformer cylinder formed in said main piston, said main piston having a passage communicating between said chambers and aligned with said pressure-transformer cylinder;

a pressure-transformer piston displaceable in said pressure-transformer cylinder and subdividing same into an opening-side compartment and a closing-side compartment, said closing-side compartment communicating with said opening-side chamber and said pressure-transformer piston having a member positioned to close said passage upon displacement of said pressure-transformer piston said pressure transformer piston having larger effective surface area disposed to fluid pressure in said opening-side compartment than in said closing-side compartment;

rapid-action piston-and-cylinder means coupled to said plate and operable in an unblocked condition of said passage to effect rapid mold-opening and mold-closing movement of said plate; and respective conduit means connecting said opening-side chamber and said-opening-side compartment in parallel to a common pressure line.

2. The device defined in claim 1 wherein said cylinders and pistons are coaxial.

3. The device defined in claim 1 or claim 2 wherein said rapid-action piston-and-cylinder means comprises a further cylinder coaxial with said main cylinder and a piston connected to said main piston and axially aligned therewith.

4. The device defined in claim 3 wherein the piston of said rapid-action means and said main piston form a unitary body.

5. The device defined in claim 1 or claim 2, further comprising a setting member for mechanically engaging and displacing said pressure-transformer piston to block said passage.

6. The device defined in claim 5 wherein said setting member is a further piston having an abutment aligned and engageable with said pressure-transformer piston and slidably received in a setting cylinder connected with said opening-side compartment.

7. The device defined in claim 1 or claim 2 wherein the conduit means communicating with said opening-side chamber is provided with a time-delay unit enabling prior pressurization of said opening-side compartment.

8. The device defined in claim 7 wherein said time-delay unit is a spring-loaded check valve.

9. The device defined in claim 7 wherein said time-delay unit is a throttle.

* * * * *